United States Patent [19]

Moriyama et al.

[11] Patent Number: 4,550,317
[45] Date of Patent: Oct. 29, 1985

[54] DRIVE GUIDE DISPLAY SYSTEM FOR MOTOR VEHICLE

[75] Inventors: Masakazu Moriyama; Takao Saito, both of Aichi, Japan

[73] Assignee: Toyota Jidosha Kabushiki Kaisha, Toyota, Japan

[21] Appl. No.: 427,534

[22] Filed: Sep. 29, 1982

[51] Int. Cl.$^4$ .............................. G08G 1/12
[52] U.S. Cl. .................. 340/995; 364/449; 364/460; 340/988
[58] Field of Search ............ 340/724, 990, 995, 988; 358/102, 103; 364/424, 443, 447, 448, 449, 460, 521, 571; 353/12; 343/451, 452

[56] References Cited

U.S. PATENT DOCUMENTS

| | | | |
|---|---|---|---|
| 3,437,873 | 4/1969 | Eggert | 340/724 |
| 4,138,726 | 2/1979 | Girault | 358/103 |
| 4,316,253 | 2/1982 | Posseme | 364/449 |
| 4,400,727 | 8/1983 | Aron | 340/995 |
| 4,400,780 | 8/1983 | Nagao | 364/521 |
| 4,470,119 | 9/1984 | Hasebe | 340/995 |
| 4,490,717 | 12/1984 | Saito | 340/995 |

FOREIGN PATENT DOCUMENTS

604307 9/1978 Switzerland .......................... 353/12

Primary Examiner—John W. Caldwell, Sr.
Assistant Examiner—Michael F. Heim
Attorney, Agent, or Firm—Cushman, Darby & Cushman

[57] ABSTRACT

A drive guide system for guiding a motor vehicle from a start point to a destination point by displaying a travel locus of the motor vehicle on a map is disclosed. A drive route map from the start point to the destination point is divided into a plurality of sections and they are stored in a memory. When a position of the motor vehicle reaches or approaches an outline of the map section displayed on a display screen, the drive route map section on the display screen is switched to the one corresponding to the direction of travel to be followed by the motor vehicle in accordance with a current azimuth of travel of the motor vehicle.

8 Claims, 16 Drawing Figures

DRIVE GUIDE DISPLAY SYSTEM FOR MOTOR VEHICLE

BACKGROUND OF THE INVENTION

1. Field of the Invention

The present invention relates to a drive guide system for a motor vehicle, and more particularly to a drive guide system for a motor vehicle suitable for graphically displaying a drive route necessary for the travel of the motor vehicle.

2. Description of the Prior Art

The drive guide system which can graphically display the drive route and a drive locus of the motor vehicle is advantageous to a driver because it takes less time to find a destination point or a target article from a map and the driver can identify a current position of the motor vehicle on the displayed map. Accordingly, the driver may not lose his way. One type drive guide system graphically displays a drive route from a start point to a destination point on a single drive route map. In such a system, when a distance from the start point to the destination point is long, it is hard to look for a fine point.

In order to resolve the above problem, a drive guide system which divides the drive route map from the start point to the destination point into a plurality of drive route sections and selectively displays one of the drive route sections as the motor vehicle travels, has been proposed. In such a prior art drive guide system, however, when the motor vehicle travels along a predetermined drive route, the drive route sections are sequentially displayed as the motor vehicle travels, but when the motor vehicle travels on a route different from the predetermined drive route, an undesired drive route map is displayed.

SUMMARY OF THE INVENTION

It is an object of the present invention to provide a drive guide system for a motor vehicle which selectively displays a plurality of sectioned drive route maps in accordance with a travel route of the motor vehicle.

It is another object of the present invention to provide a drive guide system for a motor vehicle which stores a plurality of sections of a drive route map from a start point to a destination point of the motor vehicle, and when the motor vehicle reaches or approaches an outer line of a displayed map, causes a display control unit to select a map section to be next displayed based on position information of the motor vehicle and an azimuth of travel of the motor vehicle and causes a display unit to display it.

In accordance with the present invention, there is provided a drive guide system for a motor vehicle comprising:

(A) a travel distance sensor for detecting a travel distance of said motor vehicle;

(B) an azimuth sensor for detecting an azimuth of travel of said motor vehicle;

(C) memory means for storing map information of a plurality of sections of a drive route map of said motor vehicle from a start point to a destination point;

(D) a display for displaying one of said drive route map sections in accordance with the sectioned map information stored in said memory means and displaying position information of said motor vehicle between said start point and said destination point; and (E) a display control unit for causing said display to display said position information of said motor vehicle based on signals from said travel distance sensor and said azimuth sensor, and when the position of said motor vehicle displayed on said display reaches a predetermined position, selecting one of the sectioned map information corresponding to a route to be next followed by said motor vehicle based on coordinates on a display screen of said display and the signal from said azimuth sensor, reading the selected sectioned map information from said memory means and causing said display to display said selected sectioned map information.

According to the drive guide system for the motor vehicle of the present invention, the map section on the display screen is selectively displayed in accordance with the direction of travel of the motor vehicle without presetting the drive route.

DETAILED DESCRIPTION OF THE PREFERRED EMBODIMENT

Figure 1:
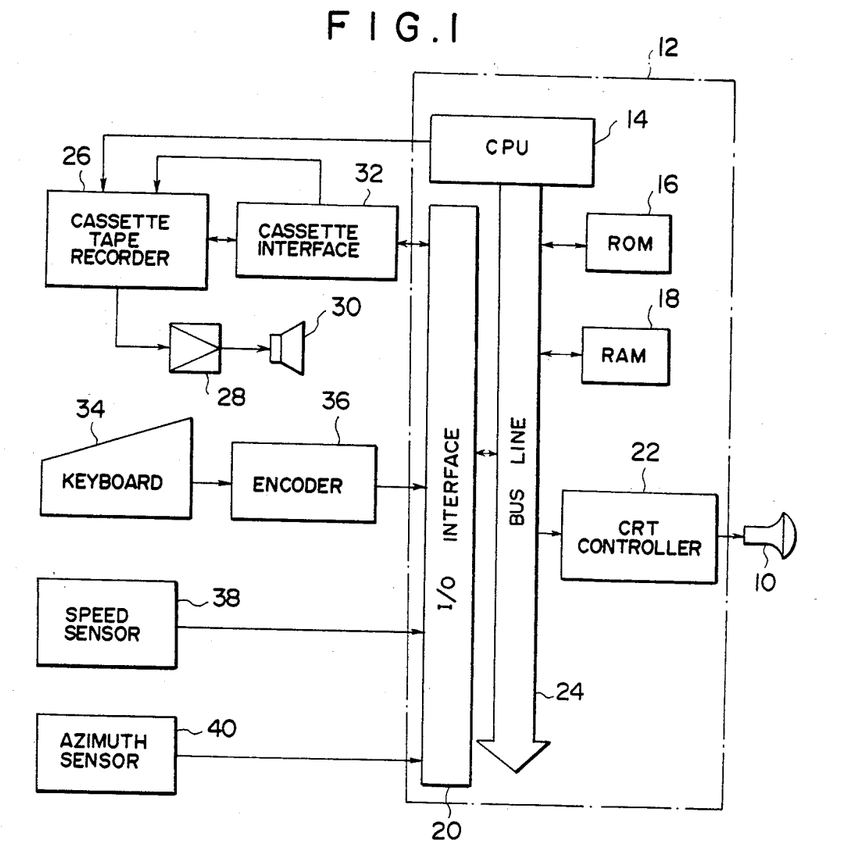
FIG. 1 shows a configuration of one embodiment of the present invention.

FIG. 1 shows an embodiment of the present invention. A CRT 10 is provided as a display for graphically displaying a drive route of a motor vehicle. The CRT 10 has a resolution power of 256 dots in a horizontal line by 192 dots in a vertical line and selects the dots by coordinates on a display screen under the control of a control unit 12 to display the drive route map and other information on the CRT 10. The control unit 12 comprises a central processing unit (CPU) 14 for carrying out various arithmetic and logic operations, a nonvolatile memory (ROM) 16, a volatile memory (RAM) 18, an interface 20 and a CRT controller 22. Those units are connected through a bus line 24.

A cassette tape is used as a memory for storing video data of the drive route and a cassette tape recorder 26 is provided to reproduce the information from the cassette tape. The cassette tape and the cassette tape recorder 26 are of a 2 to 4 track structure, one track of which is used for an audio signal. The information recorded on the one track is converted to electrical signals which is then amplified by an amplifier 28 and outputted from a speaker 30 as sound. One of the remaining tracks is used to record the video information of the drive route. As will be explained later, a plurality of sectioned drive route maps are recorded thereon. The video information is recorded in a Kansas City Standard format or a Sapporo City Standard format and supplied to the interface 20 through a cassette interface 32 as required. For the Kansas City Standard format, the cassette interface 32 modulates the output signal of the interface 20 at a transfer rate of 300 bauds and demodulates the output signal from the cassette tape recorder at the same transfer rate. The interface 20 outputs a serial signal.

Numeral 34 denotes a keyboard for supplying various instruction data to the CPU 14. The keyboard 34 has various mode designation keys and control keys. When one of the keys is depressed, a content of the depressed key is supplied to the interface 20 through an encoder 36, which converts the content of the key to an ASCII code, for example.

Numeral 38 denotes a vehicle speed sensor as a travel distance detector for detecting a travel distance of the motor vehicle. It includes a pulse generator for generating pulses which are proportional in number to the rotational speed of a tire of the motor vehicle. The pulses from the pulse generator are supplied to the CPU 14 through the interface 20.

An azimuth sensor 40 as an azimuth detector for detecting an azimuth of travel of the motor vehicle senses terrestrial magnetism to detect the azimuth of the motor vehicle and a detected signal therefrom is supplied to the CPU 14 through the interface 20. The CPU 14 carries out an operation based on the signals from the vehicle speed sensor 38 and the azimuth sensor 40 to calculate travel position information of the motor vehicle on the display screen of the CRT 10.

The ROM 16 contains a monitor program which includes a program for processing the video information of the drive route and programs for processing information from externally connected instruments, controlling the cassette tape recorder 26 and processing display operation. The RAM 18 temporarily stores the data of the cassette tape and intermediate data in the course of operation. It includes a memory which is reset by turning off a power supply (an ignition switch) to erase the memory content and a CMOS-RAM which can back up the content.

The CRT controller 22 comprises a bus controller, a character generator, a signal converter and a synchronizing signal generator, and controls the CRT 10 under program control.

Figure 2:
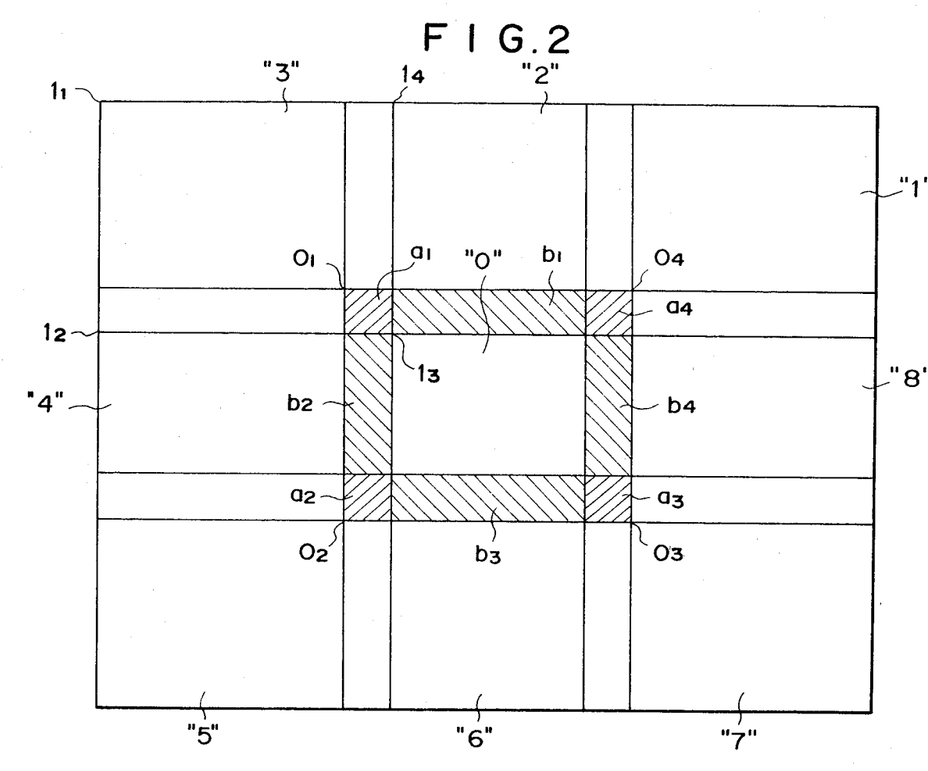
FIG. 2 shows a map format.

The CRT 10 displays one of a plurality of sectioned drive route maps. The map displayed on the CRT 10 includes overlapping areas with adjacent drive route sections. As shown in FIG. 2, the map is divided into nine sections. For example, a map "0" is defined by outlines connecting points $0_3 \sim 0_4$ and a map "1" is defined by outlines connecting points $1_1 \sim 1_4$. When the map "0" section is to be displayed on the CRT 10, the video information of that section recorded on the cassette tape includes the overlapping areas with the adjacent maps "1"~"8". The overlapping areas are shown by areas $a_1, a_2, a_3$ and $a_4$ and areas $b_1, b_2, b_3$ and $b_4$. The areas $a_1, a_2, a_3$ and $a_4$ are the overlapping areas of the maps "0", "2", "3" and "4", the maps "0", "4", "5" and "6", the maps "0", "6", "7" and "8" and the maps "0", "8", "1" and "2", respectively, and the areas $b_1, b_2, b_3$ and $b_4$ are the overlapping areas of the maps "0" and "2", the maps "0" and "4", the maps "0" and "6" and the maps "0" and "8", respectively. Since each of the map sections recorded on the cassette tape include portions of the adjacent map sections, the map displayed on the CRT 10 includes the overlapping portions with the adjacent sections. This facilitates viewing of the map when it is switched to another map section.

Figure 3:
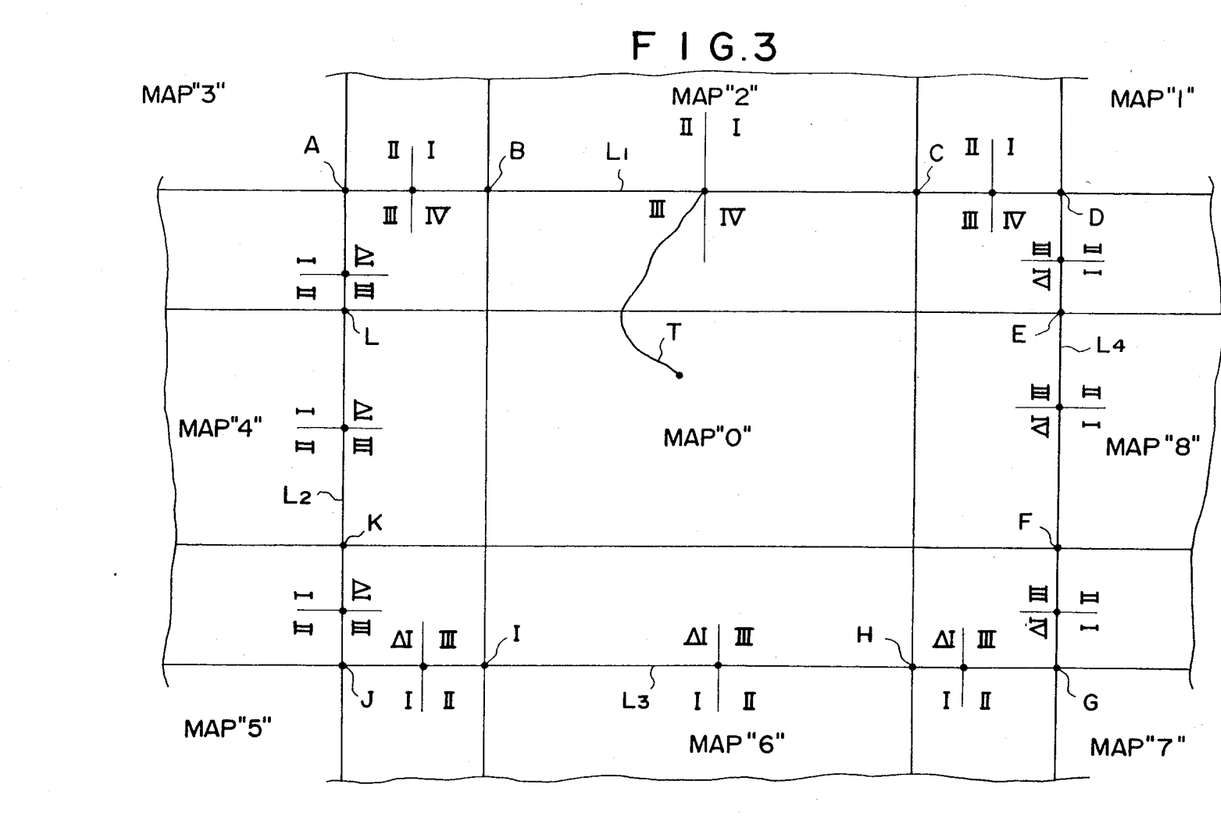
FIG. 3 illustrates map selection.
Figures 4, 4C:
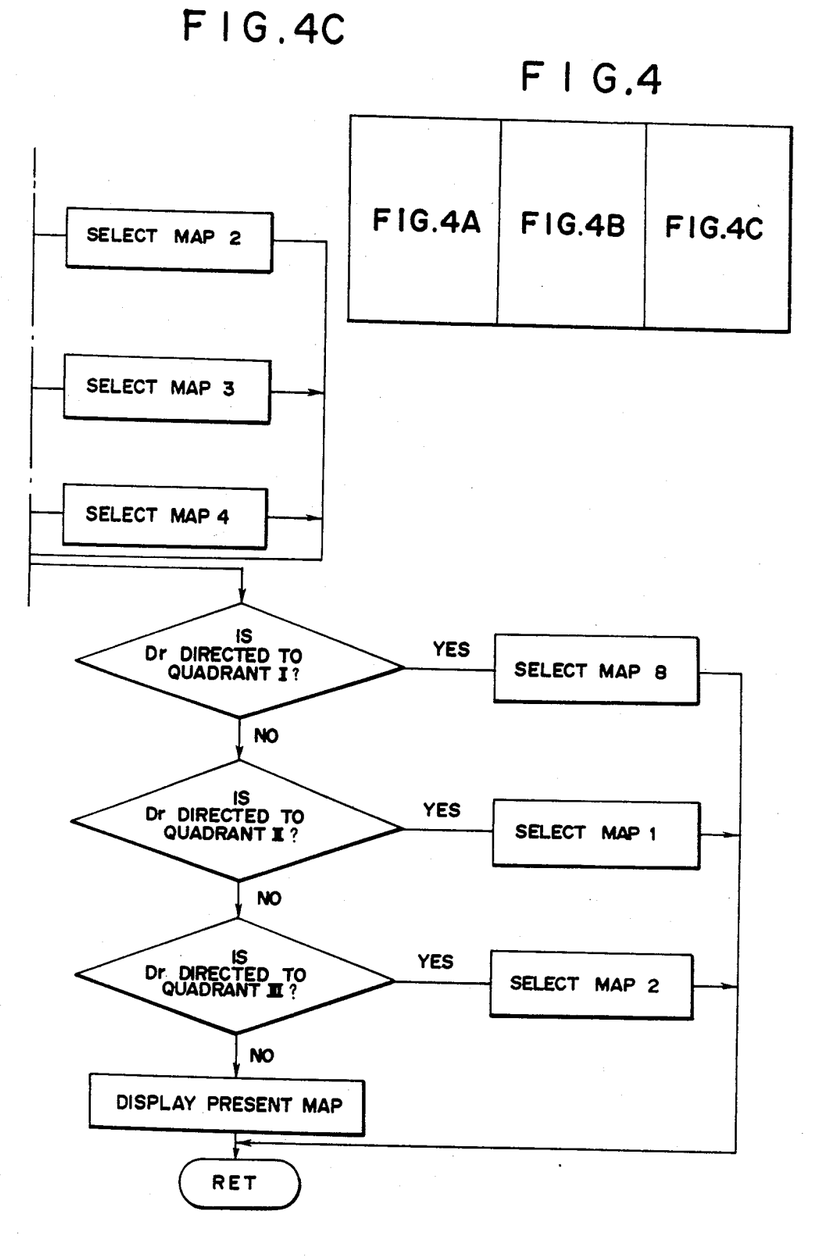
FIGS. 4, 4A, 4B, 4C and 5, 5A, 5B, 5C, 5D and 5E show flow charts for the map selection.
Figure 4A:
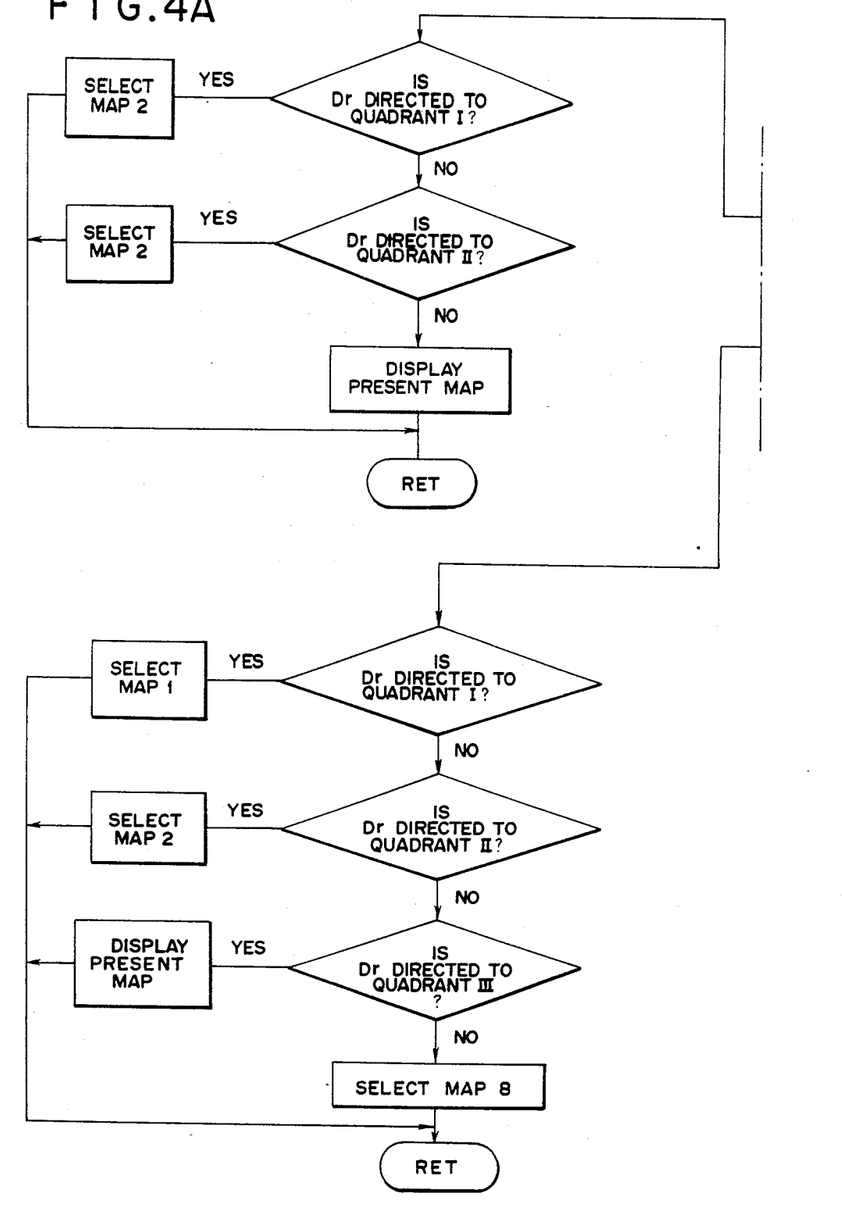
Figure 4B:
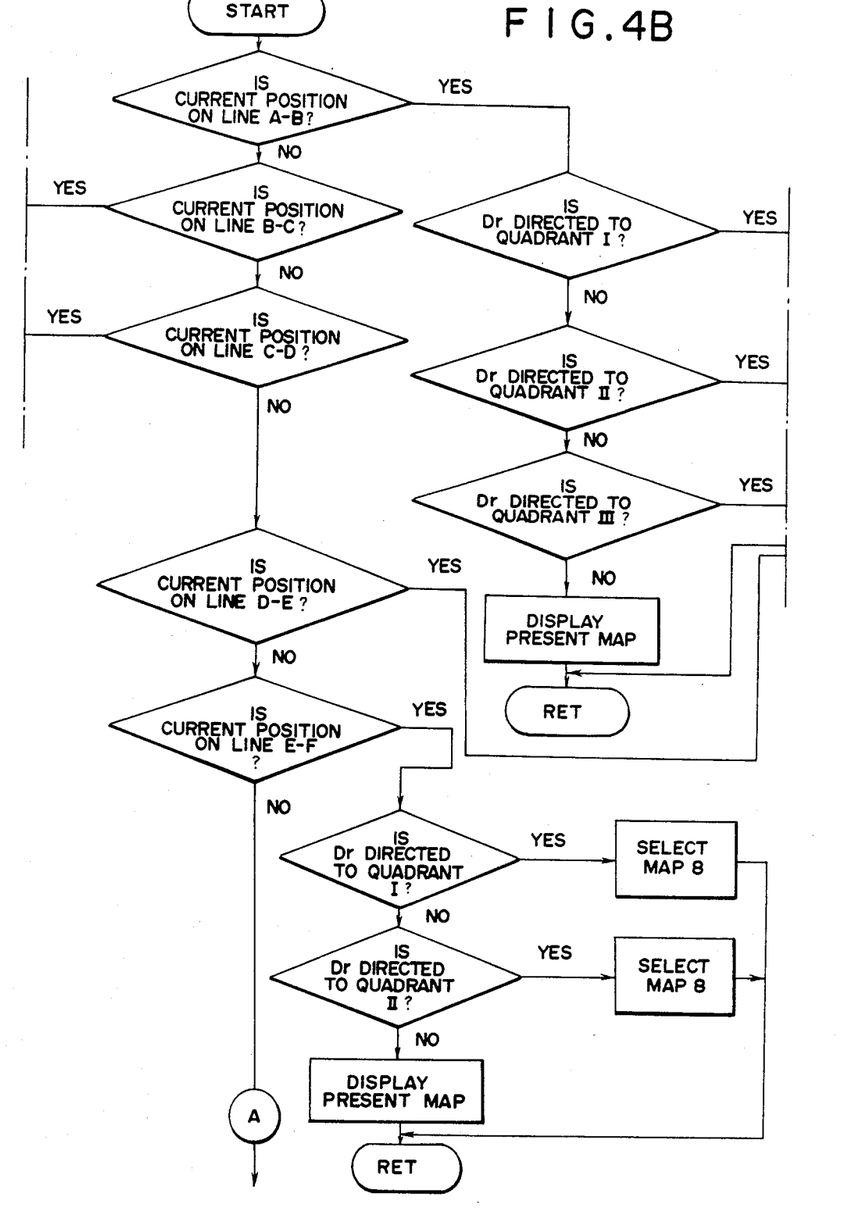
Figure 5:
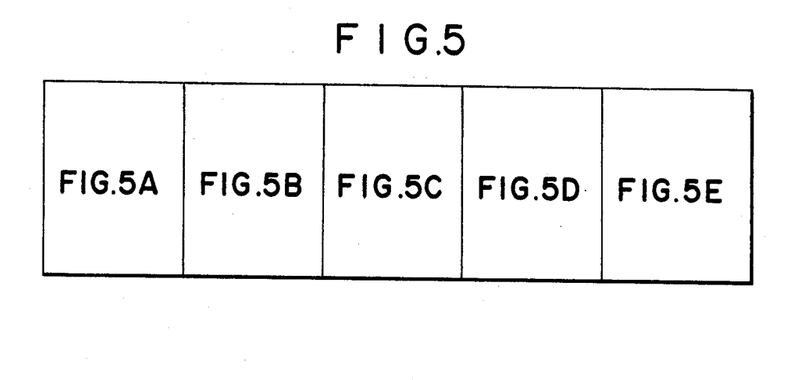
Figure 5A:
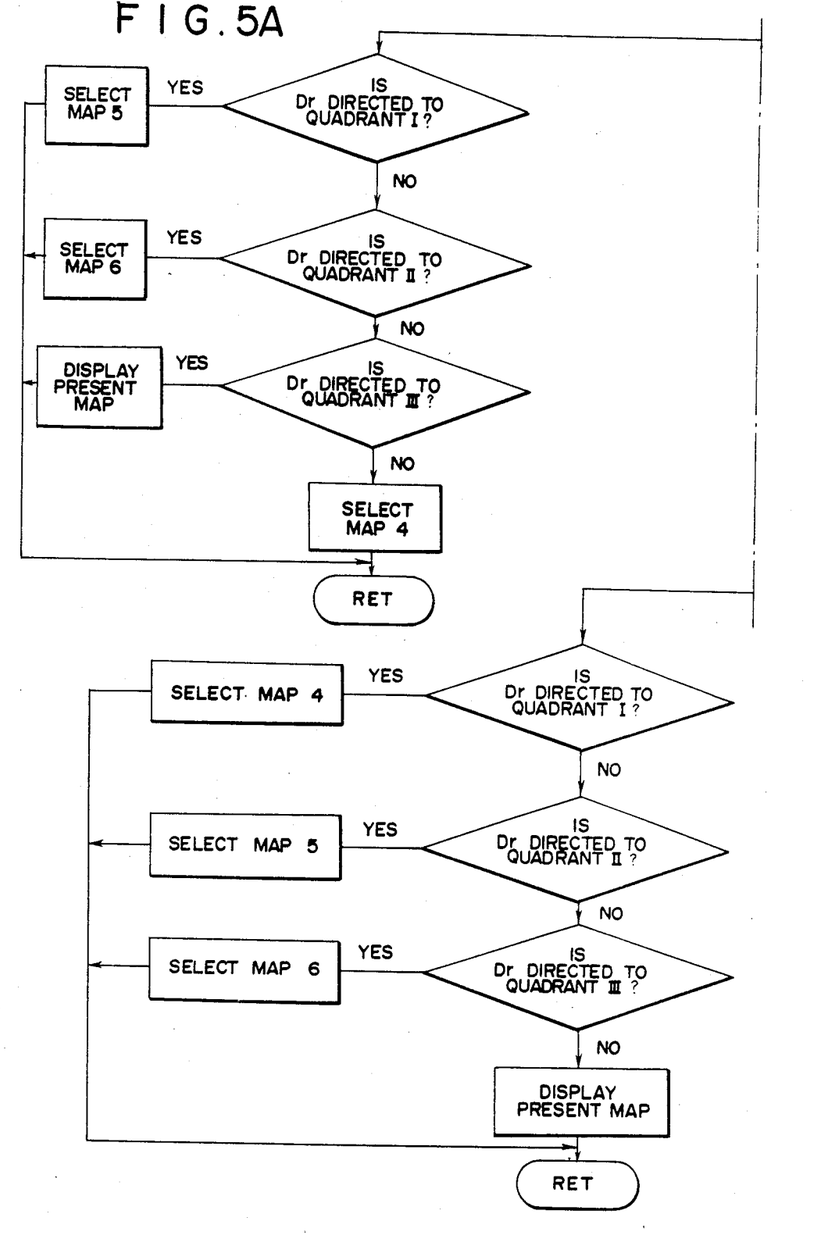
Figure 5B:
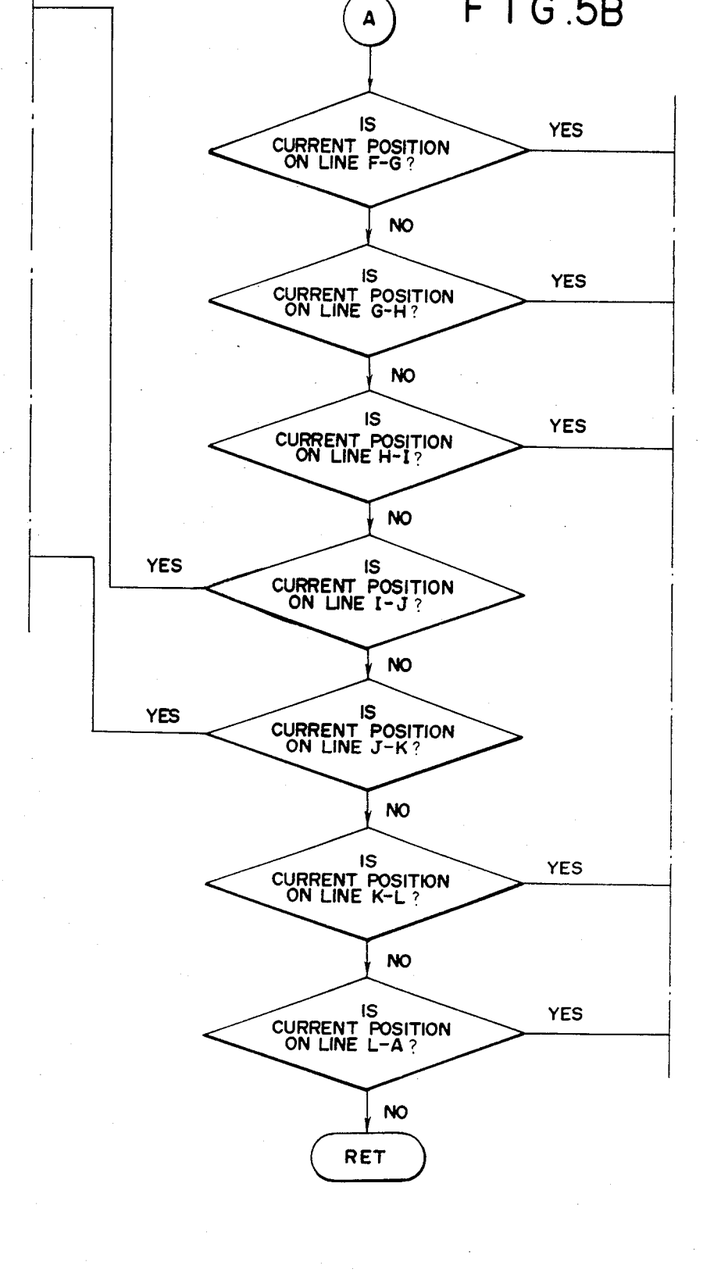
Figure 5C:
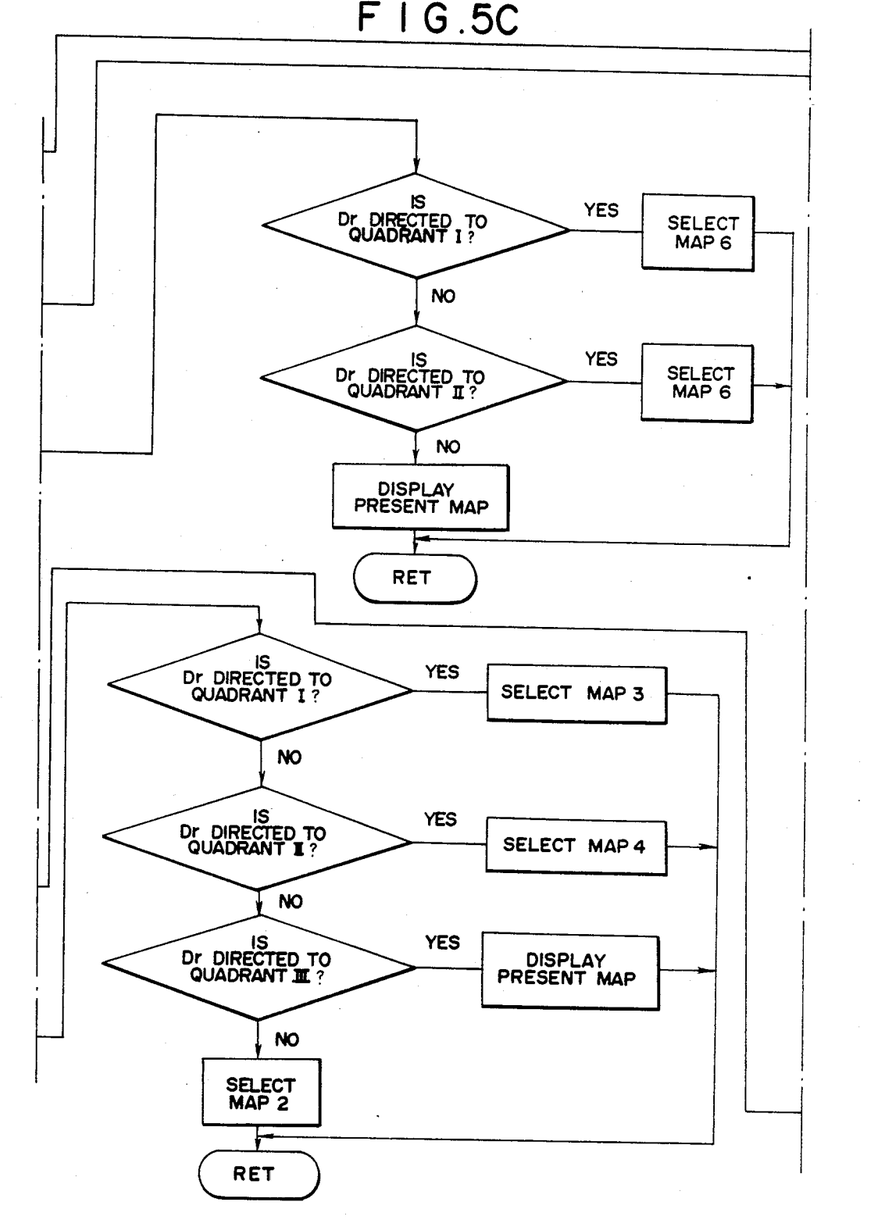
Figure 5D:
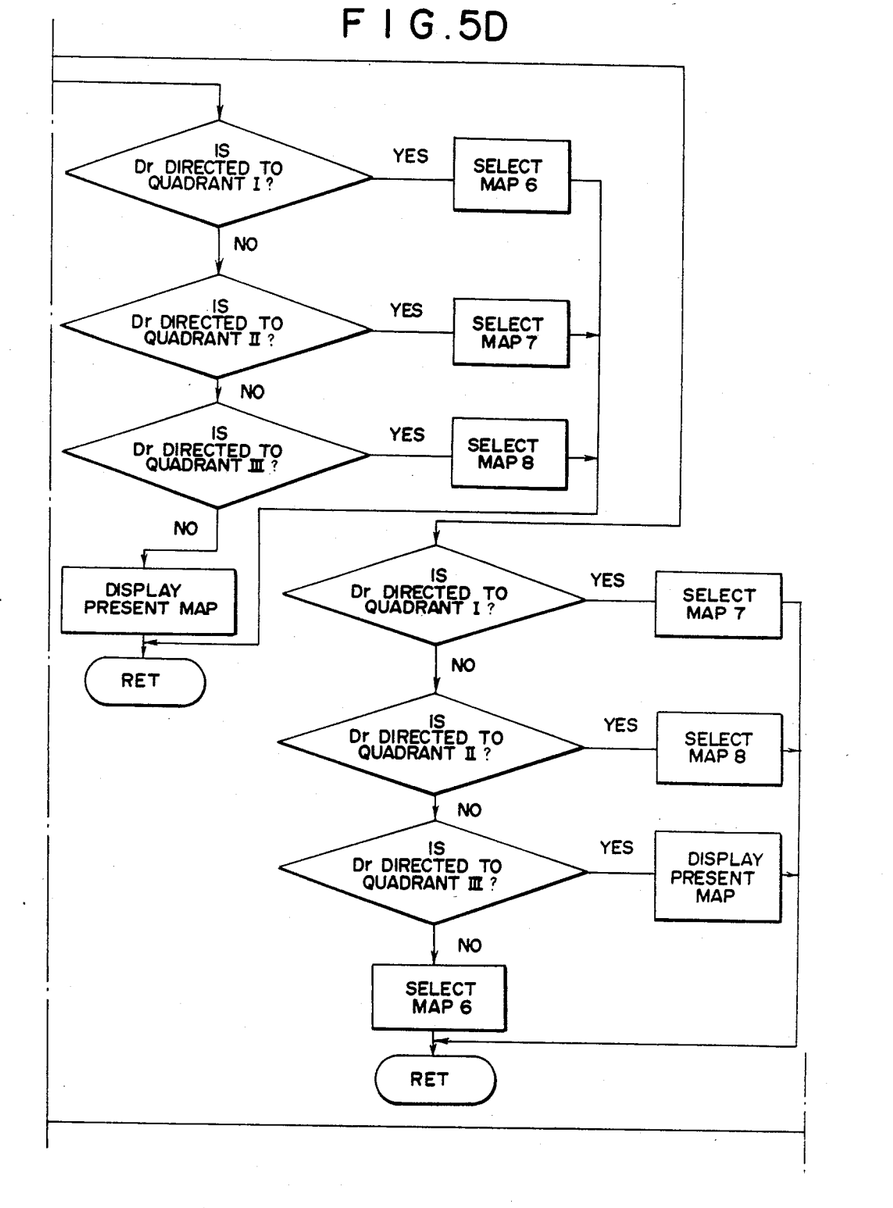
Figure 5E:
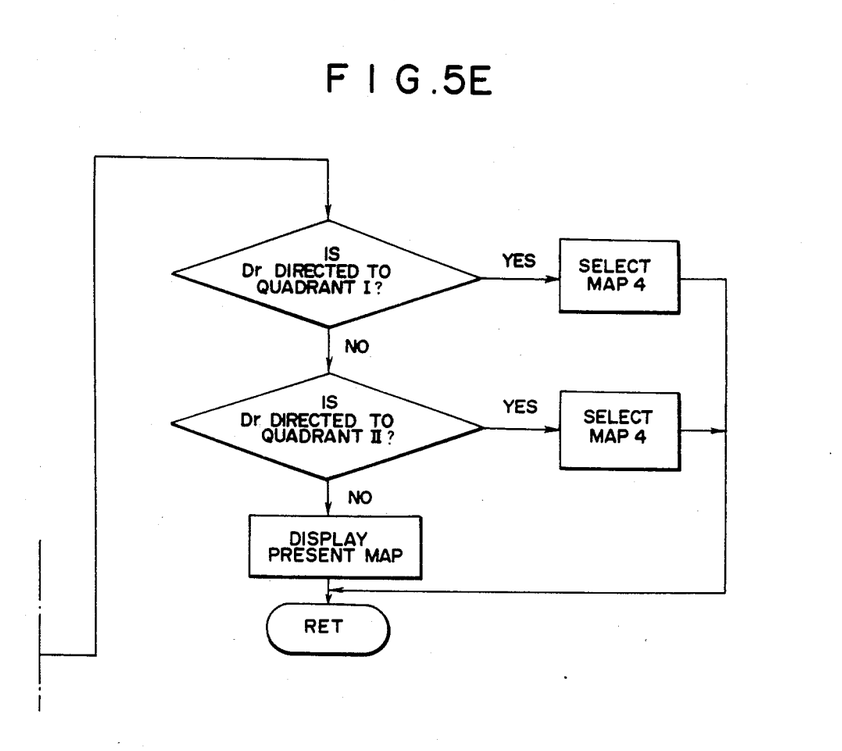

As the map is displayed on the CRT 10 in accordance with the video information recorded on the cassette tape and the motor vehicle starts to drive, a current position of the motor vehicle is displayed on the CRT 10 as a drive locus T as shown in FIG. 3 based on the travel position information derived from the signals of the vehicle speed sensor 38 and the azimuth sensor 40 as the motor vehicle travels. When the current position of the motor vehicle is displayed at a map switching point, that is, on one of the outlines $L_1, L_2, L_3$ and $L_4$ of the map "0" as shown in FIG. 3, the map switching operation is carried out based on the position information at the switching point in accordance with the steps shown in FIGS. 4 and 5, and a result of the operation is supplied to the cassette tape recorder 26 as a map switching instruction.

The present invention is characterized by selecting and displaying one of the maps adjacent to the map being displayed which is in the direction of travel of the motor vehicle. The map to be next displayed is selected depending on which one of the four outlines the current position of the motor vehicle is displayed at and the azimuth of the motor vehicle at the displayed current position.

For example, if the current position of the motor vehicle travelling on the map "0" is between the switching points A and B on the line $L_1$ as shown in FIG. 3, the map is selected depending on which one of first to fourth qurdrants the azimuth of travel (Dr) of the motor vehicle is included in. If the azimuth of travel is in the first quadrant, the map "2" is selected, if it is in the second quadrant, the map "3" is selected, if it is in the third quadrant, the map "4" is selected, and if it is in the fourth quadrant, the map currently displayed, that is, the map "0" is kept displayed. When the position of the motor vehicle is on the line connecting the switching points B and C, the map "2" is selected if the azimuth of travel of the motor vehicle is in the first or second quadrants, and the map "0" is kept displayed if the azimuth of travel is in the third or fourth quadrants. When the position of the motor vehicle is on the line connecting the switching points C and D, the map "1" is selected if the azimuth of travel of the motor vehicle is in the first quadrant, the map "2" is selected if it is in the second quadrant, the map "0" is kept displayed if it is in the third quadrant and the map "8" is selected if it is in the fourth quadrant. When the position of the motor vehicle is on the line $L_2$, $L_3$ or $L_4$, one of the maps is selected in the same manner depending on which one of the quadrants the azimuth of travel of the motor vehicle is included in, in accordance with the steps shown in FIGS. 4 and 5.

In summary, when the position of the motor vehicle displayed on the map "0" on the CRT 10 is on the line segment B-C, D-F, H-I or K-L which defines one of the areas $b_1 \sim b_4$ (see FIG. 2) which overlaps with only one of other maps, one of the maps "2", "4", "6" and "8" is selected in accordance with the azimuth of travel of the motor vehicle. If the position of the motor vehicle on the map "0" is on the line segment A-B, C-D, D-E, F-G, G-H, G-H, I-J, J-K or L-A which defines one of the areas $a_1 \sim a_4$ (see FIG. 2) which overlaps with three surrounding maps, one of the three maps is selected in accordance with the azimuth of travel of the motor vehicle. In any case, if the azimuth of travel of the motor vehicle is directed to the third or fourth quadrants, the map "0" is not switched but kept displayed.

While the map is switched when the position of the motor vehicle reaches the outline in the present embodiment, the map may be switched when the position of the motor vehicle approaches the outline.

Figure 6:
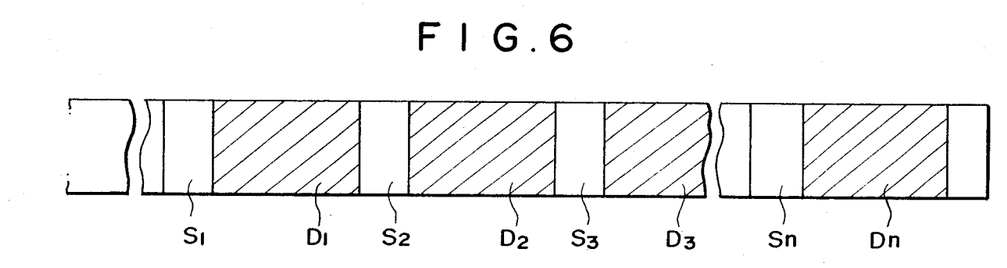
FIG. 6 shows a cassette tape format.
Figure 7:
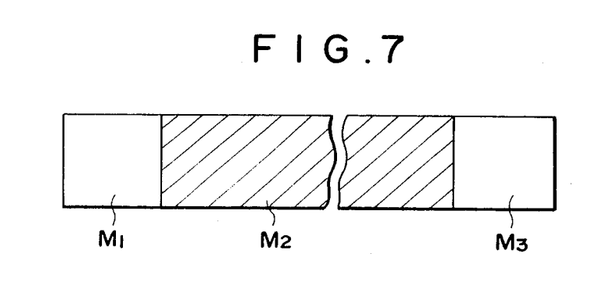
FIG. 7 shows a content of a data field.

The map selection sequence at the map switching point has been described. A drive sequence of the cassette tape recorder 26 by the map selection instruction will now be described. When the position of the motor vehicle is displayed at the map switching point, the map is selected in the manner described above, and the cassette tape recorder 26 is driven in accordance with the selected map. As shown in FIG. 6, the cassette tape includes space areas or spare areas $S_1 \sim S_n$ having a predetermined frequency signal recorded thereon and data fields $D_1 \sim D_n$. As shown in FIG. 7, each of the data fields comprises a start marker M1, a map video information M2 and an end marker M3. When the CPU 14 of the control unit 12 produces the map switching instruction, the cassette tape recorder 26 is driven to load the data field of the map corresponding to the instruction into a predetermined memory area.

Figure 8:
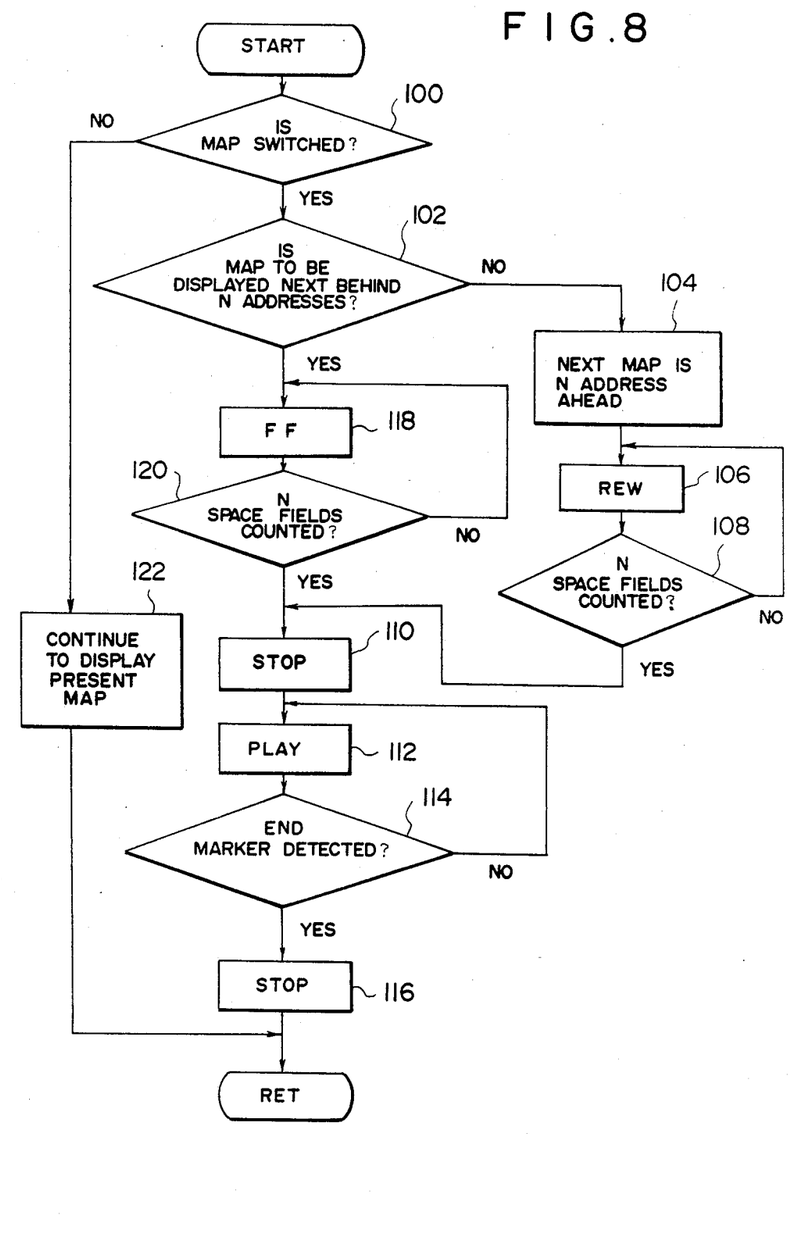
FIG. 8 shows a flow chart for selecting a desired map information of the cassette tape.

The cassette tape recorder 26 is driven in accordance with a flow chart shown in FIG. 8. In a step 100, if the decision is YES the the map switching instruction is issued, it is checked in a step 102 if the data fields ($D_1 \sim D_n$ of FIG. 6) of the map to be displayed next are recorded at the addresses which are N (N=1, 2, 3, ... n) behind the addresses of the data fields of the map currently displayed. If the decision in the step 102 is NO, that is, if the map to be displayed next is recorded at the addresses N ahead of the current map, the cassette tape is rewound in steps 104, 106 and 108 until N spare fields $S_1 \sim S_n$ have been counted, when the cassette tape is stopped in a step 110.

In a step 112, the cassette tape recorder 26 is driven in a playback mode and the video information of the data fields of the map selected by the switching instruction is displayed on the CRT 10. As the cassette tape recorder 26 plays back, the end marker M3 of the cassette tape is detected in a step 114 and the tape recorder 26 is stopped at a step 116.

On the other hand, if the decision in the step 102 is YES, the cassette tape is fast forward fed until N space fields have been counted in steps 118 and 120, and the fast forward feed of the cassette tape is stopped in the step 110. The steps 112, 114 and 116 are then carried out.

If the decision in the step 100 is NO, the process goes to the step 122 to continue to display the currently displayed map.

What is claimed is:

1. A drive guide system for a motor vehicle comprising:
   (A) a travel distance sensor for detecting a travel distance of said motor vehicle;
   (B) an azimuth sensor for detecting an azimuth of travel of said motor vehicle;
   (C) memory means for storing map information of a plurality of sections of a drive route map of said motor vehicle form a start point to a destination point;
   (D) a display for displaying one of said drive route map sections in accordance with the sectioned map information stored in said memory means and displaying position information of said motor vehicle between said start point and said destination point; and
   (E) a display control unit for causing said display to display said position information of said motor vehicle based on signals from said travel distance sensor and said azimuth sensor, and when the position of said motor vehicle displayed on said display reaches a predetermined position, selecting one of said sectioned map information corresponding to a route to be next followed by said motor vehicle based on coordinates on a display screen of said display and the signal from said azimuth sensor, reading the selected sectioned map information from said memory means and causing said display to display said selected sectioned map information; wherein said drive route map section displayed on said display includes four first areas which overlap with the respective adjacent drive route map sections and four second areas which overlap with respective three surrounding drive route map sections, and when the position of said motor vehicle reaches any one of the outlines of the drive route map section being displayed on the display which defines any one of said first areas, one overlapping map section is selected in accordance with the azimuth of travel of said motor vehicle detected by said azimuth sensor, and when the position of said motor vehicle reaches one of the outlines which defines any one of said second areas, one of said three overlapping map sections is selected in accordance with the azimuth of travel of said motor vehicle detected by said azimuth sensor.

2. A drive guide system for a motor vehicle according to claim 1, wherein said display control unit selects the sectioned may information to be displayed next from said memory means in accordance with the azimuth of travel of said motor vehicle detected by said azimuth sensor when the position of said motor vehicle reaches one of the outlines of the drive route map section being displayed on said display which displays said first and second areas and causes said display to display the drive route map section in accordance with said selected sectioned map information.

3. A drive guide system for a motor vehicle according to claim 2, wherein four areas defined by said outlines and lines orthogonal to said outlines are defined as first, second, third and fourth quadrants, and the sectioned map information in said memory means is selected in accordance with the azimuth of travel of said motor vehicle on the outline detected by said azimuth sensor depending on which one of said quadrants the azimuth of travel is directed to and the drive route map section corresponding to the selected sectioned map information is displayed on the display.

4. A drive guide system for a motor vehicle according to claim 1, wherein four areas defined by said outlines and lines orthogonal to said outlines are defined as first, second, third and fourth quadrants, and the sectioned map information in said memory means is selected in accordance with the azimuth of travel of said motor vehicle on the outline detected by said azimuth sensor depending on which one of said quardrants the azimuth of travel is directed to and the drive route map section corresponding to the selected sectioned map information is displayed on the display.

5. A drive guide system for a motor vehicle according to any one of claims 2, 4, and 3 wherein said sectioned map information is stored in a Kansas City Standard format or a Sapporo City Standard format, and spare fields arranged before and after the sectioned map information fields are counted to select the sectioned map information to be displayed next.

6. A drive guide system for a motor vehicle according to any one of claims 2, 4, and 3 wherein said display is a cathode ray tube.

7. A drive guide system for a motor vehicle according to any one of claims 2, 4, and 3 wherein said azimuth sensor senses terrestrial magnetism to detect the azimuth of travel of said motor vehicle.

8. A drive guide system for a motor vehicle according to any one of claims 2, 4, and 3 wherein the position information of said motor vehicle is recorded as a drive locus of said motor vehicle from said start point to said destination point.

* * * * *